Dec. 14, 1943.   G. M. GRAHAM   2,336,860
CONNECTING ROD ALIGNER
Filed Oct. 31, 1941
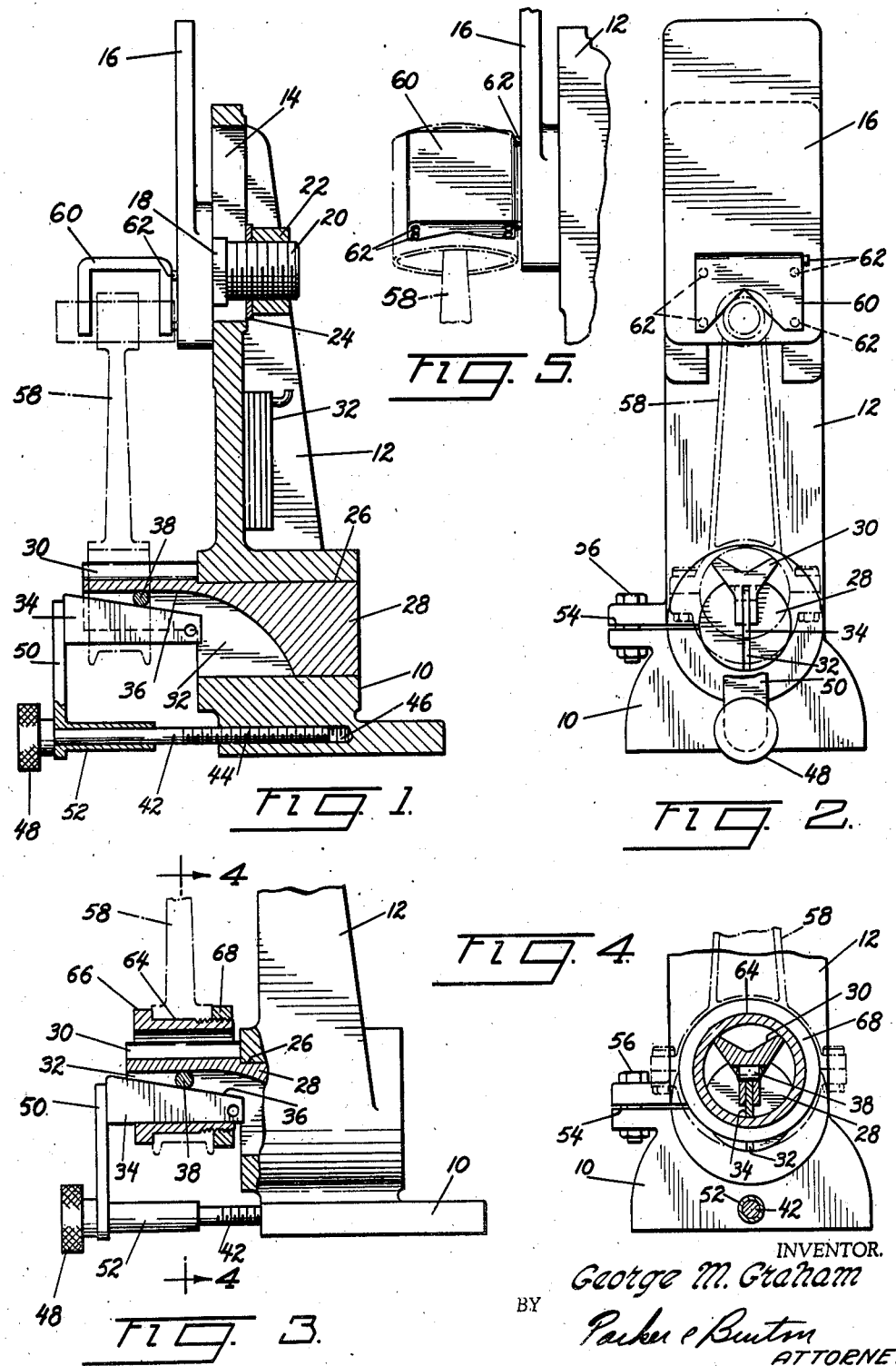
INVENTOR.
George M. Graham
BY Parker & Burton
ATTORNEYS Patented Dec. 14, 1943

2,336,860

UNITED STATES PATENT OFFICE 2,336,860

CONNECTING ROD ALIGNER

George M. Graham, Detroit, Mich., assignor to Hinckley-Myers Company, Jackson, Mich., a corporation of Michigan Application October 31, 1941, Serial No. 417,238

7 Claims. (Cl. 33—180)

This invention relates to an improved connecting rod aligner.

The object is to provide a connecting rod aligner which is so constructed that connecting rods may be tested upon it to determine whether they are in alignment or whether they are bent or twisted. This aligner is so built that connecting rods may be quickly supported thereupon for test and it is furthermore so built that it is readily adjustable to meet all general rod checking conditions within a wide range of size of rods. It is adapted to fit not only rods of different length but rods of different journal bearing size within an unusually wide range.

An important feature is the provision of a supporting arbor adapted to receive the cylindrical journal bearing of a connecting rod, which arbor is so constructed that journal bearings of rods which differ considerably in size may be received and properly supported thereupon. In one construction exhibiting the invention the arbor size may be readily varied to receive bearings varying as to diameter from $1\frac{15}{16}$ to $3\frac{1}{2}$ inches.

A meritorious feature is that the arbor construction which permits diametric adjustment is simple, stable and readily adjustable and accommodates itself automatically to certain conditions within the bearing receiving the arbor.

Certain types of connecting rods such as those on the current V-8 motor of the Ford Motor Company have bearings which turn in the rod and must be checked from the finished sides or ends of the journal bearing. To fit this particular construction an improved collar adapter receivable upon the rod and adapted to cooperate with the improved arbor structure provided on the aligner.

Other objects, advantages and meritorious features of the invention will more fully appear from the following specification, accompanying drawing, and appended claims, wherein:

Figure 1 is a vertical sectional view through a device embodying the invention,

Fig. 2 is an end view of the structure shown in Fig. 1,

Fig. 3 is a fragmentary vertical elevation partly in section showing the construction of Fig. 1 provided with the adapter collar, and Fig. 4 is a vertical sectional view taken on line 4—4 of Fig. 3.

Fig. 5 is a fragmentary vertical view similar to Fig. 1.

The aligner comprises a frame having a base 10 provided with an upright standard 12. The standard is slotted vertically adjacent its upper end as at 14 and a face plate 16 has a key portion 18 mounted within the slot and slidable lengthwise therethrough for vertical adjustment of the face plate. This key terminates in a threaded portion 20 upon which is threaded a nut 22 which engages washer 24 to hold the face plate in adjusted vertical positions. The front face of the standard on opposite sides of the slot is true and the contacting face of the face plate is true as is the outer face as hereinafter set forth.

At its lower end the standard is provided with a cylindrical bearing 26 the axis of which is normal to the outer face of the face plate. Mounted within this bearing is an arbor 28. This arbor is removably disposed within the bearing forming a tight fit therein and is provided with an axially extending arbor portion which is Y-shaped in cross section and indicated generally as 30. The two arms of the Y shown particularly in Figs. 2 and 4 in the end view have outer edges which extend parallel to the axis of the arbor and are adapted to engage the bearing within a connecting rod. These arms are in the form of wings projecting radially of the arbor and angularly disposed with respect to each other. The stem of the Y is slotted axially of the arbor as at 32 to receive a wedge shaped wing element 34. This wedged shape wing element has a tapered inner linear face 36 adapted to seat upon a pin 38 that extends transversely through the slot 32 and forms a fulcrum seat or support for the tapered face of the wedge 34 as shown particularly in Figs. 1, 3 and 4.

The slot 32 has a length of diametrical dimension which permits the wing element 34 to be moved lengthwise therein over the pin 38 and this lengthwise movement results in diametric shifting of the wing element 34 so as to vary the diameter of the arbor extension formed by the slidable wing element 34 and the two fixed arms of the Y shaped arbor portion. The wing element 34 tilts on the pin 38 so as to square itself up within the bearing in the connecting rod within which it is received to present at all times an outer edge which is parallel to the axis of the arbor and to the outer edges of the two arms of the Y portions of the arbor. A plurality of wedge elements 34 of different size are provided for substitution within the slots in the arbor.

To hold the wing element 34 at adjusted positions there is provided clamping means in the form of a screw 42 threaded at 44 to be received within the threaded opening 46 in the base. The screw has a knurled thumb grip portion 48 and carries an arm 50 which is mounted upon a sleeve 52 that is received upon the screw and this arm is adapted to abut the end of element 34 as shown in Figs. 1 and 3 to hold the element 34 at adjusted positions.

To facilitate removal or reception of the arbor 28 within the bearing 26 the frame is slotted as at 54 and provided with tightening bolts 56. Arbors having extensions of different size may be substituted within the frame. If desired an arbor having an extension of a fixed diameter to receive one particular size of connecting rod might be received within the bearing if desired.

In use the connecting rod indicated in dotted outline as 58 in the figures has its bearing mounted upon the projecting arbor. In testing the rod for alignment a V gauge of known construction and indicated as 60 is provided. This V gauge has a plurality of projecting contact points 62 arranged on one end and one side as shown in Figs. 1 and 2. The testing may be accomplished by seating the V portion of the gauge upon the piston pin as shown in Figs. 1 and 2 which brings the contact points on one end face against the contact face of the face plate 16. When these contact points all seat properly against the face plate the alignment is correct. If they do not so seat the rod is out of alignment as is well understood.

The V gauge may also be used against the piston as shown in the fragmentary view of Fig. 5 with the contact points 62 at one end of the V gauge being brought into engagement with the face plate.

In testing a connecting rod the bearing of which is not true as might be the case if the bearing in the rod has a part or bushing which rotates therein, as is the case with the Ford V-8 of current construction, it is necessary to test against true end faces on the bearing. Such a test is shown in Fig. 3. The connecting rod 50 shown in such figure has end faces on its bearing which are true and I provide an adapter collar which comprises a bearing portion 64 that is provided at one end with a radially projecting shoulder or flange 66 the inner end face of which is true and normal with respect to the axis of the bearing. The opposite end of this bearing 64 is threaded and receives a ring 68 which has an inner face that is parallel to the inner face of the flange 66 when the ring is threaded upon the bearing so that when the bearing of the connecting rod is clamped between the flange 66 and the ring 68 this adapter collar is true with respect to the true condition of the connecting rod. The connecting rod provided with this adapter collar is then received upon the arbor of the aligner in the same manner as hereinabove described in connection with the construction shown in Figs. 1 and 2.

What I claim:

1. A connecting rod aligner provided with an arbor having a plurality of relatively angularly disposed fixed radial wings, a movable radial wing supported relatively angularly with respect to the first mentioned wings and adjustable lengthwise of the arbor, said movable wing having a tapered inner edge, and means engaging said tapered inner edge to accomplish radial shifting of the wing upon movement lengthwise thereof, said means supporting said wing for tilting movement.

2. A connecting rod aligner provided with an arbor having a Y shaped portion adapted to be received within the cylindrical bearing of a connecting rod, said Y portion having its stem slotted axially of the arbor, a wedge shaped element slidable axially and radially within the slot and having a tapered inner edge seated upon a fulcrum within the slot, said slot provided with a fulcrum engaging said inner edge supporting the wedge shaped element for tilting movement within the slot and adapted to shift the element radially upon its axial movement within the slot.

3. A connecting rod aligner comprising a standard having a face plate adjacent to one end and an arbor bearing adjacent to its opposite end, an arbor within said bearing disposed normal to the face plate, said arbor having a V shaped axial extension, one end of which is adapted to abut one end of the bearing, the outer upper edges of said V extension extending parallel to the axis of the arbor, said extension being slotted axially of the arbor at the base of the V, a wedge shaped element slidably disposed within said slot having a tapered inner edge and having an outer edge adapted to be supported to extend parallel to the axis of the arbor, a pin extending transversely through the slot forming a fulcrum for the wedge and supporting it for tilting movement within the slot and for radial shifting movement upon lengthwise adjustment within the slot.

4. A connecting rod aligner comprising a support provided with an arbor bearing, an arbor seated within the bearing having one end projecting axially therebeyond, said arbor having three relatively angularly disposed radially projecting wings, each having its outer edge extending substantially parallel to the axis of the arbor, two of said wings having end portions seating against the support positioning the arbor with respect thereto, said third wing being slidable lengthwise of the arbor and supported to shift radially thereof upon such lengthwise movement, and means threadedly coupled with the support engaging said movable wing to hold it at adjusted positions.

5. A connecting rod aligner provided with a diametrically adjustable arbor and a face plate spaced radially therefrom and disposed normal to the axis of the arbor, a collar adapter receivable upon the arbor comprising a cylindrical bearing portion having a radially projecting flange at one end provided with an inner face normal to the axis of the bearing and an end ring threadedly receivable upon the opposite end of such bearing portion and provided with an inner face parallel to the inner face of the flange when the ring is received upon the bearing.

6. A connecting rod aligner comprising an upright standard having an arbor bearing adjacent to its lower end, a face plate slidably supported thereon adjacent to its upper end for movement toward and away from said bearing and disposed normal to the axis of the bearing, an arbor supported within the bearing and having an axial extension Y shaped in cross section, the stem of the Y being slotted axially, a wedge shaped element slidably received within said slot and having a tapered inner edge, a pin extending transversely through the slot engaging the element and forming a support for the tapered inner face of the element supporting the same for tilting movement within the slot, said element being adjustable lengthwise through the slot over the pin and shiftable radially therein on such lengthwise adjustment, adjustable means engaging the wedge shaped element to maintain it at different positions of adjustment.

7. A connecting rod aligner comprising a frame provided with an arbor and provided with a face plate, said face plate spaced radially from the arbor and disposed normal to the axis thereof, said arbor provided with a plurality of relatively angularly disposed radial wings each having an outer bearing supporting edge, means for supporting at least one of said wings for relative shiftable movement diametrically of the arbor, said means including means supporting said one wing for tiltable movement about a transverse axis, and means for positively shifting said one wing diametrically of the arbor.

GEORGE M. GRAHAM.